United States Patent [19]

Hibino et al.

[11] Patent Number: 4,750,466

[45] Date of Patent: Jun. 14, 1988

[54] EXHAUST GAS RECIRCULATION METHOD FOR INTERNAL COMBUSTION ENGINES FOR AUTOMOTIVE VEHICLES

[75] Inventors: Yoshitaka Hibino; Takeshi Fukuzawa; Hiromitsu Sato; Masahiko Asakura, all of Wako, Japan

[73] Assignee: Honda Giken Kogyo K.K., Tokyo, Japan

[21] Appl. No.: 3,738

[22] Filed: Jan. 16, 1987

[30] Foreign Application Priority Data

Jan. 22, 1986 [JP] Japan ................................ 61-012352

[51] Int. Cl.$^4$ ........................................... F02M 25/06
[52] U.S. Cl. ..................................... 123/571; 123/588; 123/589
[58] Field of Search ............... 123/568, 569, 571, 585, 123/587, 589

[56] References Cited

U.S. PATENT DOCUMENTS

| | | | |
|---|---|---|---|
| 4,300,516 | 11/1981 | Hayakawa | 123/571 |
| 4,349,006 | 9/1982 | Gotoh et al. | 123/571 |
| 4,454,854 | 6/1984 | Gotoh et al. | 123/571 |
| 4,454,855 | 6/1984 | Otobe et al. | 123/571 |
| 4,665,883 | 5/1987 | Amano et al. | 123/571 |

FOREIGN PATENT DOCUMENTS 0188753 11/1982 Japan .

*Primary Examiner*—Willis R. Wolfe
*Attorney, Agent, or Firm*—Arthur L. Lessler

[57] ABSTRACT

An exhaust gas recirculation method which controls the valve opening of an exhaust gas recirculating valve to values appropriate to operating conditions of an automotive vehicle and an internal combustion engine installed therein, to thereby regulate the amount of exhaust gas recirculated from an exhaust passage to an intake passage in the engine. It is determined whether the vehicle is in a predetermined starting condition, and the valve opening of the exhaust gas recirculating valve is set to a first value when the vehicle is not in the predetermined starting condition, otherwise to a second value smaller than the first value. Preferably, the determination of whether the vehicle is in the predetermined starting condition is made based on the rotational speed of the engine and the speed of the vehicle.

3 Claims, 5 Drawing Sheets

| Ne \ PB | PB6 | PB7 | --- | PBj | --- | PB15 |
|---|---|---|---|---|---|---|
| N1 | L1.6 | L1.7 | | | | |
| N2 | L2.6 | L2.7 | | | | |
| ⋮ | | | | | | |
| Ni | | | | Lij | | |
| ⋮ | | | | | | |
| N10 | | | | | | L10.15 |

EXHAUST GAS RECIRCULATION METHOD FOR INTERNAL COMBUSTION ENGINES FOR AUTOMOTIVE VEHICLES

BACKGROUND OF THE INVENTION

This invention relates to an exhaust gas recirculation method for internal combustion engines for automotive vehicles, and more particularly to a method of this kind which is applied when the vehicle is in a starting condition.

An exhaust gas recirculation method, i.e. so-called EGR, which aims at reducing nitrogen oxides (NOx), emitted from an internal combustion engine for automotive vehicles, by returning part of exhaust gases from the engine to an intake passage thereof is known e.g. from Japanese Provisional Patent Publication (Kokai) No. 57-188753 which comprises previously setting required valve opening values of an exhaust gas recirculating valve arranged across an exhaust gas recirculating passage communicating between an exhaust passage and the intake passage, and storing the set required valve opening values in storage means, reading one of the stored values from the storage means in response to values of a plurality of operating parameters of the engine (e.g. intake pipe absolute pressure at a zone downstream of a throttle valve in the intake passage and rotational speed of the engine) so as to obtain an optimal exhaust gas recirculation amount, and controlling the valve opening of the exhaust gas recirculating valve to a desired valve opening corresponding to the read required valve opening value.

According to the conventional exhaust gas recirculation methods, the required valve opening values of the exhaust gas recirculating valve are set in such a manner that the amount of recirculated exhaust gases is increased during acceleration of the engine when NOx is emitted in large quantities, whereas during deceleration the amount of recirculated exhaust gases is decreased to thereby secure stability in combustion.

In this kind of conventional control method, the engine is determined to be accelerating when increases are detected in the engine rotational speed and the intake passage absolute pressure are detected. As a result, when the vehicle is in a starting condition where the engine rotational speed and the intake passage absolute pressure suddenly increase, the engine is erroneously detected to be accelerating, which entails an increase in the exhaust gas recirculation amount. However, at vehicle start when high output is required of the engine, increased recirculation of exhaust gases tends to deteriorate the combustion performance of the engine whereby the engine fails to produce sufficient output to start the vehicle and becomes liable to undergo stalling, etc.

One way of solving this problem is to equip the engine with detecting means such as gear shift position detecting means and clutch engagement detecting means for detection of vehicle start, whereby when the vehicle is detected by the detecting means to be starting the exhaust gas recirculation amount is decreased. However, the provision of such detecting means results in a more complicated construction of the exhaust gas recirculation control system as well as higher production cost of the control system.

SUMMARY OF THE INVENTION

It is the object of the invention to provide an exhaust gas recirculation method for internal combustion engines for automotive vehicles, which enables controlling of the exhaust gas recirculation amount in response to the starting condition of the vehicle without the use of any particular means for detecting the starting condition of the vehicle, to thereby improve the driveability at the start of the vehicle and reduce the production cost of the exhaust gas recirculation control system.

According to the invention, there is provided a method of controlling exhaust gas recirculation in an internal combustion engine for an automotive vehicle, the engine having an exhaust passage, an intake passage, an exhaust gas recirculating passage communicating the exhaust passage with the intake passage, and an exhaust gas recirculating valve arranged across the exhaust gas recirculating passage for regulating the amount of exhaust gas recirculated from the exhaust gas passage to the intake passage, wherein the valve opening of the exhaust gas recirculating valve is controlled in response to operating conditions of the engine so as to regulate the amount of recirculated exhaust gas to values appropriate to the operating conditions of the engine. The method comprises the steps of:

(1) determining whether or not the vehicle is in a predetermined starting condition;

(2) setting the valve opening of the exhaust gas recirculating valve to a first value when the vehicle is determined not to be in the predetermined starting condition at step (1); and (3) setting the valve opening of the exhaust gas recirculating valve to a second value which is smaller than the first value when the vehicle is determined to be in the predetermined starting condition at step (1).

Preferably, the predetermined starting condition of the vehicle is detected by means of a plurality of operating parameters indicative of operating conditions of the engine and the vehicle.

More preferably, the predetermined starting condition of the vehicle is a starting condition in which the rotational speed of the engine is lower than a predetermined value and at the same time the speed of the vehicle is lower than a predetermined value.

Still more preferably, the predetermined starting condition of the vehicle is a starting condition in which the speed of the vehicle is lower than a predetermined value and at the same time the ratio of the rotational speed of the engine to the speed of the vehicle is larger than a predetermined value.

The above and other object, features and advantages of the invention will be more apparent from the ensuing detailed description taken in conjunction with the accompanying drawings.

DETAILED DESCRIPTION

The method of the invention will now be described in detail with reference to the drawings.

Figure 1:
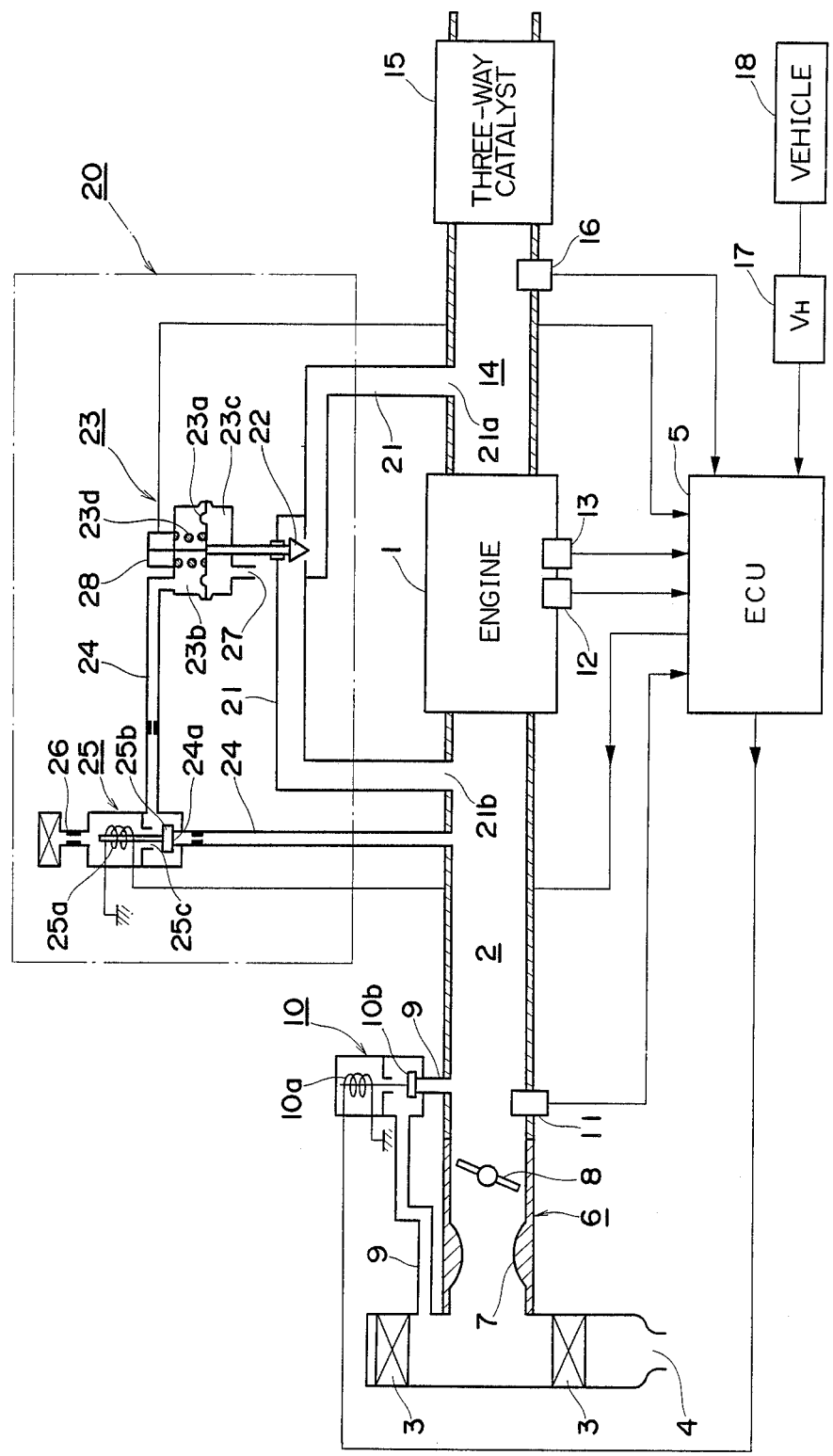
FIG. 1 is a diagram of the whole arrangement of an internal combustion engine for an automotive vehicle, equipped with a carburetor and an exhaust gas recirculation control system, to which is applied the method according to the invention.

FIG. 1 shows the whole arrangement of an internal combustion engine for automotive vehicles, equipped with a carburetor and an exhaust gas recirculation control system, to which is applied the method according to the invention. Reference numeral 1 designates an internal combustion engine which may be a four-cylinder type, for instance. One end of an intake pipe 2 is connected to the engine 1. The other end of the intake pipe 2 communicates with an atmospheric air intake port 4 via an air cleaner 3, and a carburetor 6 which may be a known type comprising of a venturi 7 and a nozzle (not shown) is provided in the intake pipe 2. A throttle valve 8 is arranged in the intake pipe 2 at a location downstream of the carburetor 6. Reference numeral 9 designates a secondary air supply passage, one end of which communicates with the air cleaner 3 and the other end of which communicates with the intake pipe 2 at a location downstream of the throttle valve 8. Arranged across the secondary air supply passage 9 is a secondary air control valve 10 formed of an electromagnetic valve, which controls the quantity of secondary air to be supplied to the engine 1 via the secondary air passage 9 and has a solenoid 10a electrically connected to an electronic control unit (hereinafter called "the ECU") 5, and a valve body 10b disposed to open and close the secondary air passage 9 depending on whether or not the solenoid 10a is energized.

An absolute pressure (PB) sensor 11 is connected to the intake pipe 2 at a location downstream of the throttle valve 8, to supply an output signal indicative of detected absolute pressure in the intake pipe 2 to the ECU 5.

An engine coolant temperature (TW) sensor 12, which may be formed of a thermistor or the like, is mounted on the cylinder block of the engine 1 in a manner embedded in the peripheral wall of an engine cylinder having its interior filled with cooling water, of which an electrical signal indicative of detected coolant temperature is supplied to the ECU 5.

An engine rotational speed (Ne) sensor (hereinafter referred to as "the Ne sensor") 13 is arranged in facing relation to a camshaft, not shown, of the engine 1 or a crankshaft of same, not shown. The Ne sensor 13 is adapted to generate a TDC signal pulse at a predetermined crank angle position before the top dead center (TDC) position at the start of the intake stroke of each cylinder. The TDC signal is supplied to the ECU 5.

A three-way catalyst 15 is arranged in an exhaust pipe 14 of the engine 1 for purifying ingredients HC, CO and NOx contained in the exhaust gases. An O$_2$ sensor 16 is inserted into the exhaust pipe 14 at a location upstream of the three-way catalyst 15 for detecting the concentration of oxygen in the exhaust gases and supplying an electrical signal indicative of detected oxygen concentration to the ECU 5.

Further connected to the ECU 5 is a vehicle speed (VH) sensor 17 for detecting the speed of the vehicle 18 in which the engine is installed and supplying an electrical signal indicative of detected speed to the ECU 5.

An exhaust gas recirculation device 20 forming part of the exhaust gas recirculation control system will now be described.

An exhaust gas recirculating passage 21 of the device 20 is connected at one end 21a to the exhaust pipe 14 at a location upstream of the three-way catalyst 15, and at the other end 21b to the intake pipe 2 at a location downstream of the throttle valve 8. An exhaust gas recirculating valve 22 is arranged across the exhaust gas recirculating passage 21 for controlling the amount of exhaust gases being returned to the intake pipe 2. The exhaust gas recirculating valve 22 has its valve body operatively coupled to a diaphragm 23a of a negative pressure-responsive actuator 23. The actuator 23 has a negative pressure chamber 23b and a lower chamber 23c, which are partly defined by the diaphragm 23a. A spring 23d is arranged in the negative pressure chamber 23b and urges the diaphragm 23a in the direction of closing the exhaust gas recirculation valve 22. The lower chamber 23c is communicated with the atmosphere by way of an air passage 27, while the negative pressure chamber 23b is communicated with the interior of the intake pipe 2 at a location downstream of the throttle valve 8 by way of a negative pressure passage 24 having a restriction therein. A three-way valve 25 formed of an elctromagnetic valve having a solenoid 25a is arranged across the negative pressure passage 24. When the solenoid 25a of the threeway valve 25 is energized, an opening 25c communicating with the atmosphere via an atmospheric pressure passage 26 provided with a filter and a restriction therein is closed and simultaneously the negative pressure passage 24 is opened, so that negative pressure developed in the intake pipe 2 at a zone downstream of the throttle valve 8 is introduced into the negative pressure chamber 23b of the negative pressure-responsive actuator 23. As a result, there will be developed a difference between pressures acting upon the opposite side surfaces of the diaphragm 23a so that the diaphragm 23a is displaced against the force of the spring 23d to open the exhaust gas recirculating valve 22. More specifically, with energization of the solenoid 25a of the three-way valve 25, the exhaust gas recirculation valve 22 has its valve opening increased to allow an increased amount of exhaust gases to flow through the exhaust gas recirculating passage 21 to the intake pipe 2. On the other hand, when the solenoid 25a of the three-way valve 25 is deenergized, the valve body 25b is displaced to close the opening 24a of the negative pressure passage 24 and simultaneously open the opening 25c so that the atmospheric pressure is introduced into the negative pressure chamber 23b of the negative pressure-responsive actuator 23. On this occasion, the pressure difference between pressures acting upon the opposite side surfaces of the diaphragm 23a becomes almost zero whereby the diaphragm 23a is displaced by the urging force of the spring 23d to bring the exhaust gas recirculating valve 22 into a fully closed position. As long as the solenoid 25a of the three-way valve 25 continues to be deenergized, the exhaust gas recirculating valve 22 is kept fully closed to interrupt the exhaust gas recirculation.

In FIG. 1, reference numeral 28 designates a valve lift sensor connected to the diaphragm 23a of the negative pressure-responsive actuator 23 for detecting the displacement of the diaphragm 23a, i.e. the actual valve opening of the exhaust gas recirculating valve 22. This sensor 28 is also electrically connected to the ECU 5.

The ECU 5 determines operating conditions of the engine on the basis of various engine operating parameter signals from the aforementioned sensors, supplies a control signal in the form of on-off pulses to the three-way valve 25 to energize same so as to make zero the difference between a valve opening command value LCMD which is determined as a function of the intake pipe absolute pressure PBA and the engine rotational speed Ne, etc., and the actual valve opening value LACT of the exhaust gas recirculating valve 22 which is detected by the valve lift sensor 28, and supplies a control signal in the form of on-off pulses to the control valve 10 provided in the secondary air passage 9 in response to the signals from the aforementioned sensors such as $O_2$ sensor 16 so as to change the duty ratio of the control valve 10 to thereby control the air-fuel ratio to a desired value.

Figure 2:
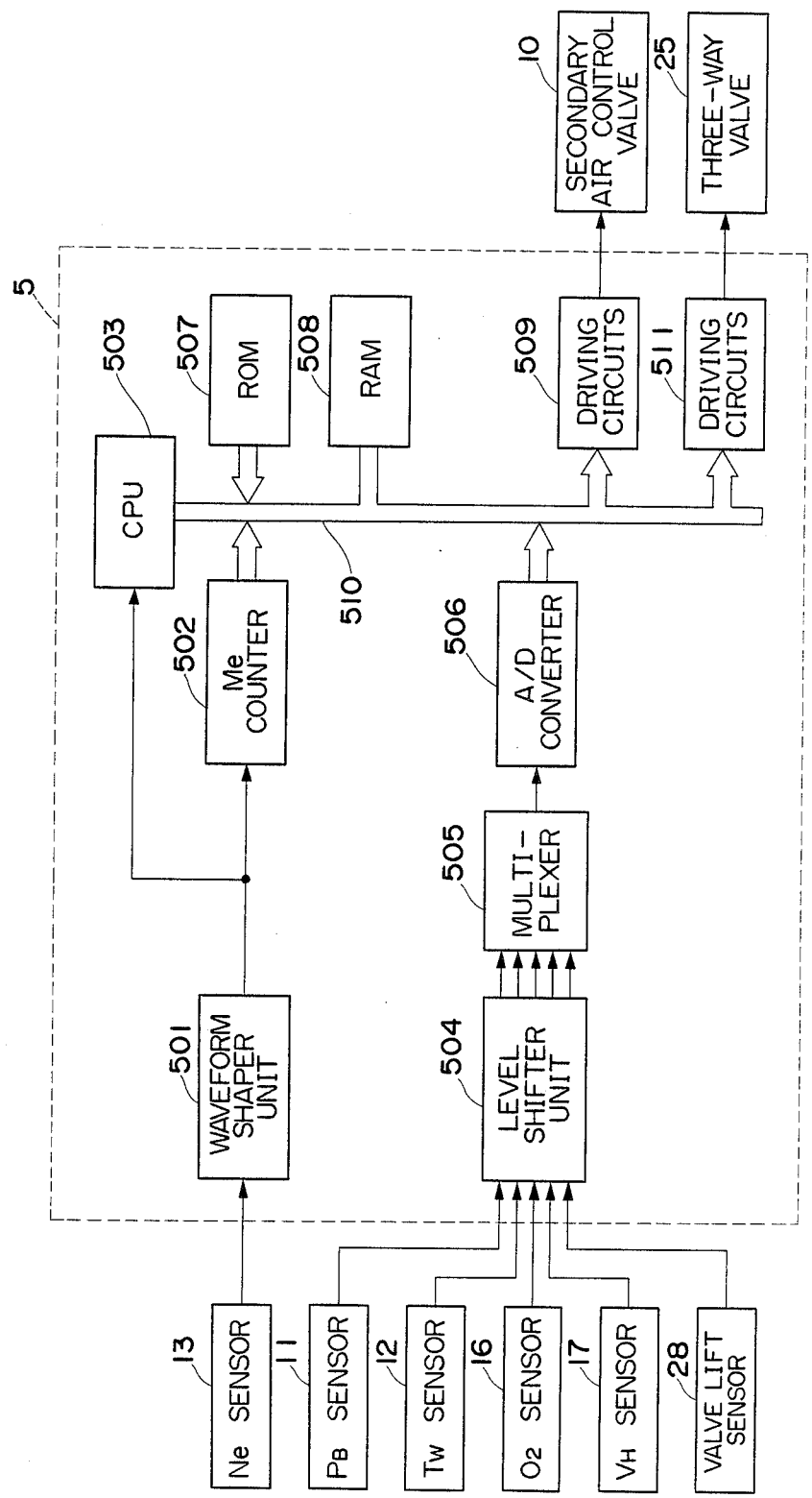
FIG. 2 is a circuit diagram of the internal construction of an electronic control unit (ECU) 5 appearing in FIG. 1.

FIG. 2 shows an electrical circuit within the ECU 5 in FIG. 1. An output signal from the Ne sensor 13 is applied to a waveform shaper unit 501 to have its pulse waveform shaped, and the shaped signal is successively supplied to a central processing unit (hereinafter called "the CPU") 503 as an interrupt signal for starting execution of a program shown in FIG. 3 or FIG. 4, as well as to an Me value counter 502 as the TDC signal for calculation of engine rotational speed. The Me value counter 502 counts the time interval between an immediately preceding pulse of the TDC signal and a present pulse of the same signal, inputted thereto from the Ne sensor 13. Therefore, its counted value Me corresponds to the reciprocal of the actual engine rotational speed Ne. The Me value counter 502 supplies the counted value Me to the CPU 503 via a data bus 510.

Respective output signals from the absolute pressure (PB) sensor 11, the engine coolant temperature sensor 12, the $O_2$ sensor 16, the vehicle speed (VH) sensor 17, the valve lift sensor 28, and other engine operating parameter sensors have their voltage levels shifted to a predetermined voltage level by a level shifter unit 504 and successively applied to an analog-to-digital (A/D) converter 506 through a multiplexer 505. The analog-to-digital converter 506 successively converts into digital signals analog output signals from the aforementioned various sensors, and the resulting digital signals are supplied to the CPU 503 via the data bus 510.

Further connected to the CPU 503 via the data bus 510 are a read-only memory (hereinafter called "the ROM") 507, a random access memory (hereinafter called "the RAM") 508, and driving circuits 509 and 511. The RAM 508 temporarily stores results of calculations effected within the CPU 503, while the ROM 507 stores among others the program for controlling the exhaust gas recirculation executed within the CPU 503, a basic valve lift map (FIG. 6) wherein basic valve lift values are stored as function of the intake pipe absolute pressure (PB) and the engine rotational speed Ne.

The CPU 503 executes the control programs in such a manner, as will be described later, that it determines operating conditions of the engine, such as the vehicle-starting condition and the accelerating condition, in response to output signals from the various engine operating parameter sensors such as the Ne sensor 13, the absolute pressure sensor 11, and the vehicle speed sensor 17, and supplies a control signal in the form of on-off pulses through the data bus 510 to the driving circuit 511 for the three-way valve 25 to energize same with as duty ratio corresponding to the determined operating condition, to thereby control the exhaust gas recirculation quantity, while it calculates the duty ratio of the secondary air control valve 10 in response to the output signal from the $O_2$ sensor 16, etc. to supply a control signal in the form of on-off pulses corresponding to the calculated duty ratio to the driving circuit 509 through the data bus 510. The driving circuit 509 supplies a corresponding driving signal to the secondary air control valve 10 to energize same with a duty ratio corresponding to the calculated value. The driving circuit 511 supplies a driving signal to the three-way valve 25 in response to the control signal to thereby energize the three-way valve 25.

Reference is now made to the exhaust gas recirculation control method for an internal combustion engine according to the invention, which is executed by the construction stated above.

Figure 3:
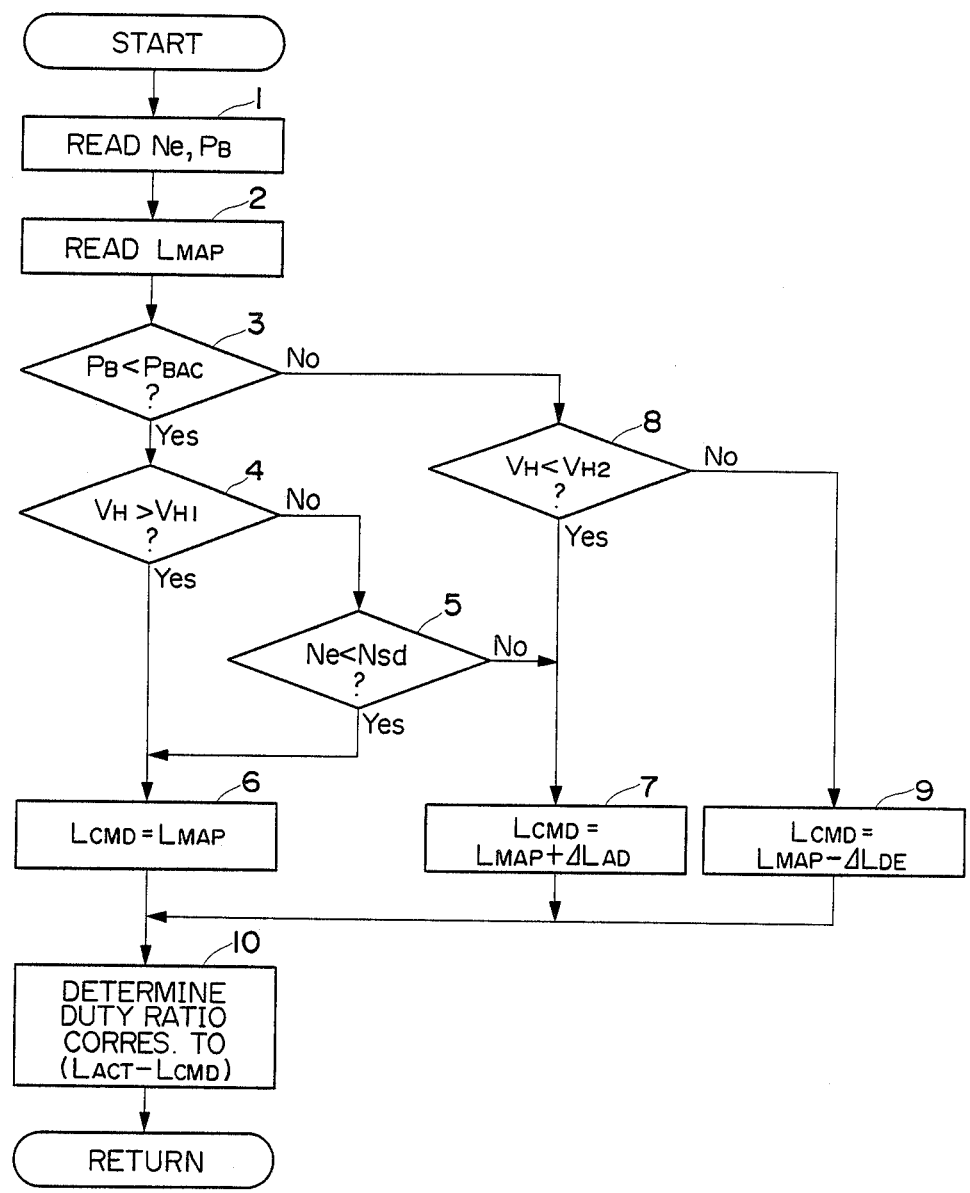
FIG. 3 is a program flowchart showing a manner of controlling exhaust gas recirculation according to a first embodiment of the invention.

FIG. 3 is a flowchart of the program according to a first embodiment of the invention for determining whether the vehicle is in a predetermined starting condition, and calculating the required valve opening command value of the exhaust gas recirculating valve 22.

The method of the first embodiment determines whether the vehicle is in the predetermined starting condition based on engine rotational speed Ne and vehicle speed VH.

First, detected values of the engine rotational speed Ne and the intake pipe absolute pressure PB are read at step 1, and then, at step 2, a basic valve lift value LMAP corresponding to these read values is read from the valve lift map stored in the ROM 507.

Figures 5, 6:
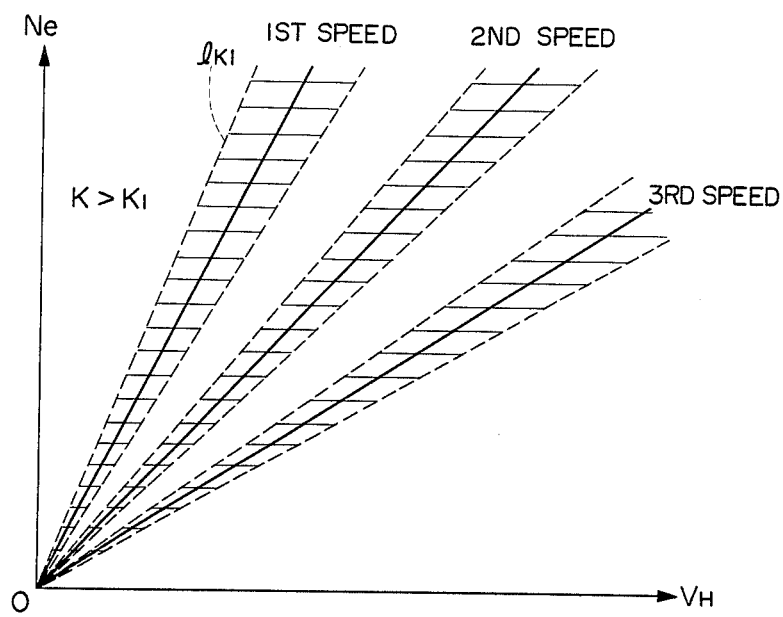
FIG. 5 is a graph showing the relationship between the vehicle speed (VH) and the rotational speed of the engine (Ne)
FIG. 6 shows a map of basic valve lift values LMAP.

In the valve lift map which is shown in FIG. 6 by way of example, basic valve lift values LMAP of the exhaust gas recirculation valve 22 are set, as a function of the engine rotational speed Ne and the intake pipe absolute pressure PB, at values appropriate to the predetermined starting condition of the vehicle. In the FIG. 6 map there are provided ten predetermined values of the engine rotational speed Ne, i.e. N1–N10 ranging from 500 to 4000 rpm, for instance, and ten predetermined values of the intake pipe absolute pressure PB, i.e. PB6–PB15 ranging from 60 to 600 mmHg, for instance.

Next, it is determined at step 6 whether or not the detected value of the intake pipe absolute pressure PB read at step 1 is lower than a predetermined value PBAC (e.g. 360 mmHg), which is the maximum value up to which the intake pipe absolute pressure PB can rise at normal vehicle start. If the answer to the question of step 3 is yes, that is, if it is assumed that the vehicle is in a normal starting condition (i.e. a starting condition without sudden acceleration) where the throttle valve is opened to a relatively small degree, the program proceeds to step 4 wherein it is determined whether or not the vehicle speed VH is higher than a predetermined value VH1 (e.g. 17 km/h), which is a vehicle speed indicative of termination of the vehicle starting condition. If the answer to the question of step 4 is No, the program proceeds to step 5 to determine whether or not the engine rotational speed Ne is lower than a predetermined value Nsd (e.g. 1000 rpm), which is an engine rotational speed indicative of termination of the vehicle starting condition. If the answer to the question of step 5 is Yes, it is determined that the vehicle is being started under the predetermined starting condition, and then the program proceeds to step 6 wherein the valve opening command value LCMD of the exhaust gas recirculating valve 22 is set to the basic valve lift value LMAP which was read at the step 2 as the basic value appropriate to the predetermined starting condition. Then, the program proceeds to step 10. If the answer to the question of step 5 is No, it is assumed that the vehicle starting condition has already terminated, and the program proceeds to step 7 wherein the valve opening command value LCMD is set by adding a predetermined incremental value ΔLAD to the basic valve lift value LMAP read at the step 2, followed by execution of the step 10.

If the answer to the question of step 3 is No, that is, if the engine is in a sudden accelerating condition or a normal cruising condition, which means that the engine is not being started, then the program proceeds to the next step 8 wherein it is determined whether or not the vehicle speed VH is smaller than a predetermined value VH2 (e.g. 45 km/h). The step 8 is provided for the purpose of determining whether or not the vehicle is cruising in a town. If the result of the determination at the step 8 is affirmative, that is, if the vehicle is cruising in a town, the program proceeds to step 7 to set the valve opening command value LCMD. On the other hand, if the result is negative, that is, if the vehicle is running in the country or on an expressway, the program proceeds to step 9 wherein the valve opening command value LCMD is set by subtracting a predetermined decremental value ΔLDE from the basic valve opening value LMAP read at the step 2. After execution of step 7 or step 9 the program proceeds to the step 10. By setting the LCMD value in this way, when the vehicle is cruising in a town, the exhaust gas recirculation amount is increased so as to improve the emission characteristics of the engine, and when the vehicle is running in the country or on an expressway, required engine output is always secured.

Incidentally, it is when the engine is operating in a low load operating condition that the answer to the question of step 4 becomes Yes, and in that case, as in the case when the vehicle is in the predetermined starting condition, the program executes the step 6 to set the valve opening command value LCMD to the basic valve lift value LMAP which was read at the step 2, and then proceeds to the step 10.

At the step 10 the duty ratio with which the operation of the three-way valve 25 (FIG. 1) is energized is set in accordance with the difference between the value LACT read from the lift sensor 28 (FIG. 1) and the valve opening command value LCMD determined as above in response to the engine operating condition at the step 6, 7, or 9, followed by termination of the program.

By setting the valve opening command value LCMD to a smaller value when the vehicle is in the predetermined starting condition than a value it is set to when the vehicle is not in the predetermined starting condition, as described above, it is possible to attain desired engine output and improve the starting accelerability when the vehicle is in the predetermined starting condition.

Figure 4:
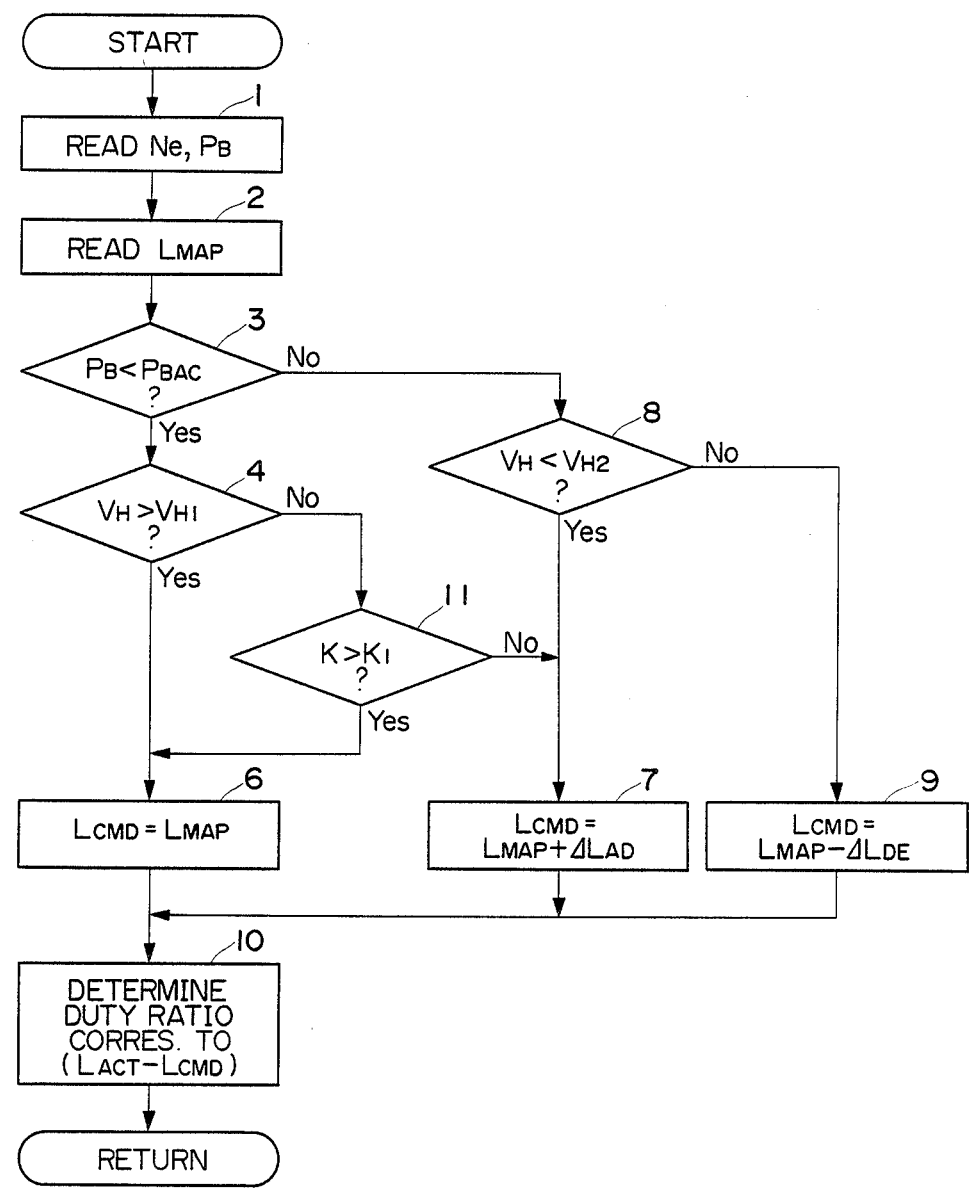
FIG. 4 is a program flowchart showing a manner of controlling exhaust gas recirculation according to a second embodiment of the invention.

FIG. 4 is a flowchart showing the program according to a second embodiment of the invention, which is executed to determine whether the vehicle is in the predetermined starting condition, and calculate the required valve opening command value for the exhaust gas recirculating valve 22.

According to the method of the second embodiment, the predetermined starting condition of the vehicle is determined on the basis of the ratio K of the engine rotational speed Ne to the vehicle speed VH (i.e. K=ne/VH). In other words, this method determines the predetermined starting condition of the vehicle based on whether or not the engine clutch is in a half engaged state where the ratio K of the engine rotational speed to the vehicle speed is high.

The flowchart of FIG. 4 differs from that of FIG. 3 only in that the step 5 of the latter is replaced by a step 11 in the former wherein it is determined whether or not the ratio K of the engine rotational speed Ne to the vehicle speed VH is larger than a predetermined value K1. As is seen from FIG. 5, the predetermined value K1 is the maximum value (the steepest slope 1K1 in FIG. 5) that the ratio K can assume when the transmission gear of a manual transmission installed in the vehicle is set in a position at which the engine driving force for driving the vehicle becomes the maximum, i.e. the first speed position, with the engine clutch engaged. It is thus possible to detect the half engagement of the engine clutch by the determination at step 11.

If the answer to the question of step 11 is Yes, it is assumed that the vehicle is in the predetermined starting condition, that is, it is being started wherein the engine clutch is half engaged, and then the valve opening command value LCMD is set to the basic valve lift value LMAP read at the step 2 as the value suitable to the predetermined starting condition, at the step 6. If the answer to the question of step 11 is No, it is assumed that the vehicle is in the after-start condition wherein the engine clutch fully engages, and then the valve opening command value LCMD is set by adding the predetermined incremental value ΔLAD to the basic valve lift value LMAP read at the step 2 (step 7). Then, the program proceeds to the step 10. When the vehicle is in a sudden starting condition wherein high output is generated by the engine, the result of the determination at step 3 becomes No because of increased intake pipe absolute pressure PB, and on this occasion, as in the first embodiment, even if the engine clutch is half engaged, the program proceeds to the step 7 to set the valve opening command value LCMD.

As described above, according to the method of the second embodiment, the valve opening command value is set to a smaller value when the vehicle is in the predetermined starting condition wherein the ratio of the engine rotational speed to the vehicle speed is larger than the predetermined value, than when the vehicle is not in the predetermined starting condition. Consequently, the engine output at the vehicle start (when the clutch is half engaged) is so large as to facilitate smooth starting of the vehicle.

Although in the second embodiment the predetermined ratio K1 of the engine rotational speed to the vehicle speed is set based on the gear position of a manual transmission installed in the vehicle, this is not limitative but the ratio K1 may be set based, e.g. on the relationship between the input rotational speed and output rotational speed of a torque converter of an automatic transmission installed in the vehicle.

What is claimed is:

1. A method of controlling exhaust gas recirculation in an internal combustion engine for an automotive vehicle, said engine having an exhaust passage, an intake passage, an exhaust gas recirculating passage communicating said exhaust passage with said intake passage, and an exhaust gas recirculating valve arranged across said exhaust gas recirculating passage for regulating the amount of exhaust gas recirculated from said exhaust gas passage to said intake passage, wherein the valve opening of said exhaust gas recirculating valve is controlled in response to operating conditions of said engine so as to regulate the amount of recirculated exhaust gas to values appropriate to the operating conditions of said engine, the method comprising the steps of:
- (1) detecting the rotational speed of said engine while said vehicle is in a predetermined starting condition in which the speed of said vehicle is lower than a predetermined value;
- (2) determining whether the ratio of the rotational speed of said engine detected in step (1) to the speed of said vehicle is larger than a predetermined value;
- (3) setting the valve opening of said exhaust gas recirculating valve to a first value when it is determined in step (2) that the ratio of the rotational speed of said engine to the speed of said vehicle is not larger than said predetermined value, to provide an amount of recirculated exhaust gas corresponding to said first value; and
- (4) setting the valve opening of said exhaust gas recirculating valve to a second value which is smaller than said first value when it is determined in step (2) that the ratio of the rotational speed of said engine to the speed of said vehicle is larger than said predetermined value, to provide an amount of recirculated exhaust gas which corresponds to said second value and is smaller than the amount provided in step (3).

2. A method of controlling exhaust gas recirculation in an internal combustion engine for an automotive vehicle, said engine having an exhaust passage, an intake passage, an exhaust gas recirculating passage communicating said exhaust passage with said intake passage, and an exhaust gas recirculating valve arranged across said exhaust gas recirculating passage for regulating the amount of exhaust gas recirculated from said exhaust gas passage to said intake passage, wherein the valve opening of said exhaust gas recirculating valve is controlled in response to operating conditions of said engine so as to regulate the amount of recirculated exhaust gas to values appropriate to the operating conditions of said engine, the method comprising the steps of:
- (1) detecting the rotational speed of said engine while said vehicle is in a predetermined starting condition in which the speed of said vehicle is lower than a predetermined value;
- (2) determining whether the rotational speed of said engine detected in step (1) is higher than a predetermined value;
- (3) setting the valve opening of said exhaust gas recirculating valve to a first value when it is determined in step (2) that the rotational speed of said engine is higher than said predetermined value, to thereby obtain an amount of recirculated exhaust gas corresponding to the set first value; and
- (4) setting the valve opening of said exhaust gas recirculating valve to a second value which is smaller than said first value when it is determined in step (2) that the rotational speed of said engine is lower than said predetermined value, to thereby obtain an amount of recirculated exhaust gas which is smaller than the amount of recirculated exhaust gas obtained in step (3).

3. A method as claimed in claim 1, wherein said predetermined starting condition of said vehicle corresponds to an operating condition of said engine which is satisfied wherein at least when absolute pressure in said intake passage is lower than a predetermined value.

* * * * *